United States Patent [19]

Schwartz et al.

[11] Patent Number: 5,314,557
[45] Date of Patent: May 24, 1994

[54] METHOD OF UNITIZING PACKAGES BY MEANS OF A STRETCHABLE ADHESIVE TAPE

[75] Inventors: Mark E. Schwartz, Mahtomedi, Minn.; Karl W. Kreckel, Benzenbergweg, Fed. Rep. of Germany

[73] Assignee: Minnesota Mining and Manufacturing Company, St. Paul, Minn.

[21] Appl. No.: 102,537

[22] Filed: Jul. 28, 1993

Related U.S. Application Data

[63] Continuation of Ser. No. 731,341, Jul. 19, 1991, abandoned.

[51] Int. Cl.$^5$ .............................................. B29C 65/00
[52] U.S. Cl. .................................... 156/229; 156/162; 156/185; 156/212; 156/213; 53/399; 53/580; 206/386; 206/813
[58] Field of Search .................... 156/84, 85, 184, 185, 156/160, 162, 212, 213, 229; 53/387.1, 397, 399, 580, 582, 587, 588; 206/386, 813

[56]  References Cited

U.S. PATENT DOCUMENTS

| Re. 24,906 | 12/1960 | Ulrich . | |
| 2,532,011 | 11/1950 | Dahlquist et al. . | |
| 3,239,478 | 3/1966 | Harlan, Jr. . | |
| 3,239,994 | 3/1966 | Etzel et al. | 53/198 |
| 3,535,189 | 10/1970 | Hall et al. . | |
| 3,950,203 | 4/1976 | Van der Wal | 156/213 |
| 4,279,717 | 7/1981 | Eckberg et al. . | |
| 4,286,047 | 8/1981 | Bennett et al. | 156/273.7 |
| 4,342,815 | 8/1982 | Doehnert . | |
| 4,365,710 | 12/1982 | Swanson | 206/386 |
| 4,387,552 | 6/1983 | Lancaster et al. | 53/587 |
| 4,409,776 | 10/1983 | Usui | 53/587 |
| 4,432,185 | 2/1984 | Geisinger | 53/587 |
| 4,543,099 | 9/1985 | Bunnelle et al. | 156/229 X |
| 4,556,596 | 12/1985 | Meuli | 156/229 X |
| 4,607,476 | 8/1986 | Fulton, Jr. | 53/587 |
| 4,754,594 | 7/1988 | Lancaster | 53/587 |
| 4,905,451 | 3/1990 | Jaconelli et al. | 53/587 |
| 4,961,963 | 10/1990 | Peters . | |
| 4,968,766 | 11/1990 | Kendzioski . | |
| 4,995,224 | 2/1991 | Yourgalite et al. | 53/587 |
| 5,003,752 | 4/1991 | Matsumoto | 53/587 |
| 5,046,303 | 9/1991 | Becicka et al. | 53/587 |
| 5,048,261 | 9/1991 | Lancaster, III et al. | 53/399 |
| 5,161,349 | 11/1992 | Lancaster, III | 53/587 |

FOREIGN PATENT DOCUMENTS 7724383  9/1977 Fed. Rep. of Germany .
7824445U1 9/1978 Fed. Rep. of Germany .

OTHER PUBLICATIONS

European Search Report.
*Palette Stabilization*, Pack Report, May 1991, pp. 98–99, and translation thereof.
*Unitizing: How to get it all together–and keep it that way*, Package Engineering, Aug. 1980.

Primary Examiner—David A. Simmons
Assistant Examiner—James J. Engel, Jr.
Attorney, Agent, or Firm—Gary L. Griswold; Walter N. Kirn; David L. Weinstein

[57]  ABSTRACT

Means for unitizing objects, e.g., packages, through the use of a stretchable, detackifiable, pressure-sensitive adhesive tape. In the preferred embodiment, the tape comprises a highly extensible, substantially non-recoverable backing bearing on at least one major surface thereof a layer of pressure-sensitive adhesive. This tape has the dual capability of (1) being capable of being firmly bonded to a substrate and (2) being detackified after being stretched.

11 Claims, 3 Drawing Sheets

METHOD OF UNITIZING PACKAGES BY MEANS OF A STRETCHABLE ADHESIVE TAPE

This is a continuation of U.S. application Ser. No. 07/731,341 filed Jul. 19, 1991, now abandoned.

FIELD OF THE INVENTION

This invention relates to means for securing objects together for storage, shipping, or other purposes.

DISCUSSION OF THE ART

In many manufacturing plants, products or packages are at some point grouped with other products or packages to facilitate handling, storage, and shipping. Such grouping is commonly referred to as "unitizing". Perhaps the most common form of unitizing is palletization. As a specific facet of unitization, palletization becomes a process in which the unit load is joined with a pallet to provide for handling, primarily, with fork lift trucks. A palletized load must have vertical strength and horizontal or lateral stability. The stacking strength of a load (particularly loads of products packaged in cartons or containers) depends on the pattern or layout of each tier. For most cases, a column stack (one box directly on top of another) yields the greatest vertical strength. The column stack, however, has little lateral stability. Interlocking patterns increase lateral stability at some sacrifice in vertical strength. These patterns additionally can be used to optimize pallet space utilization. The end result of balancing vertical stacking strength, lateral stability, and space utilization can be an array of pallet patterns, requiring a different one for each product or package being palletized.

Several equipment manufacturers have added a horizontal strapping section to their palletizers to stabilize loads during the palletizing operation. Besides saving space, cutting labor costs, and simplifying handling, strapping during palletizing is also effective for stabilizing extremely unstable loads before they must be handled. Usually two or three strapped tiers will stabilize most loads, with many users strapping only the second layer from the top.

One means of providing lateral stability at low cost has been the use of adhesives to bond the layers of the load together. Adhesives for this purpose must have good shear strength to resist lateral forces that would cause a load to come apart. They must also have low tensile strength so that the load can be disassembled without damaging the product or package. Steel and, more recently, plastic strappings have been used for securing unitized and palletized loads. The plastics, e.g. polypropylene, nylon, and polyester, have replaced steel in enough applications so that now 80% of the strapping used for general palletizing is plastic. Of the plastics, polyester has been the most frequently used replacement for steel strapping, on account of the high breaking strength of the newer polyester products.

A few years ago, shrink wrapping of pallet loads generated considerable enthusiasm. While insuring load integrity, shrink wrapping also provided protection from dust, dirt, water, and pilferage. In more recent years, however, shrink wrapping has lost some of its initial appeal because of rising energy costs. The large ovens sometimes used for shrinking the films around pallet loads consume too much energy in securing the unitized loads and the resultant costs have caused shrink wrapping to lose ground to the more energy-efficient stretch wraps.

The major share of pallet stabilization is being accomplished with stretch wrap. The variety of available equipment for stretch wrapping runs from hand-held manual wrapping devices to automatic high-speed systems.

One area of unitization that is becoming more and more popular is bundling. Lumber, sheets of insulation, and bags of pet food have enjoyed successful bundling applications. Bundling has found application in a number of different industries, including the manufacture of lighting fixtures. Palletizing, unitizing, securing, wrapping, and bundling with strapping, adhesives, shrink wraps, or stretch wraps are activities common to nearly every packaging and shipping department.

It would be desirable to find a wrapping or strapping material that would avoid the following problems:

(1) pull of fibers from the surface of containers on account of aggressive, sticky adhesives;

(2) elimination of heating equipment needed to shrink wrapping material;

(3) elimination of additional mechanical devices to secure palletized loads, e.g., clips to join the ends of strapping material;

(4) elimination of excessive amounts of waste material, e.g., used stretch wrap;

(5) minimizing excessive looseness of strapping material, which results in movement of packages;

(6) minimizing excessive tightness of strapping material, which results in damaging packages; and (7) prevention of air circulation about the unitized load in order to minimize moisture condensation.

SUMMARY OF THE INVENTION

This invention provides a means for unitizing objects, e.g., packages, through the use of a stretchable, detackifiable, pressure-sensitive adhesive tape. In the preferred embodiment, the tape comprises a highly extensible, substantially non-recoverable backing bearing on at least one major surface thereof a layer of pressure-sensitive adhesive. This tape has the dual capability of (1) being capable of being firmly bonded to a substrate and (2) being detackified after being stretched.

In order to unitize a group of objects, a small portion of the tape, preferably from a roll, is first applied to a first object, the tape, if in a roll, is then simultaneously unwound, stretched to induce detackification, and wrapped around the remaining objects; finally a portion of the unstretched tape is adhered to an object in the group to anchor the stretched, detackified tape. The tape can be easily removed merely by releasing the adhering portions of the tape from the regions of objects to which these portions are adhered.

The backing of the stretchable, detackifiable pressure-sensitive adhesive tape preferably has a Young's modulus of at least about 2,500 psi, more preferably at least about 3,000 psi, but less than about 100,000 psi, most preferably between about 5,000 and about 30,000 psi. The backing preferably has a high tensile strength, a lengthwise elongation at break of at least about 150%, more preferably at least about 200%, still more preferably at least about 600 to 800%, and preferably has low recovery, e.g., less than about 50% elastic recovery after being stretched, more preferably less than about 30% elastic recovery. If the tape is stretched up to its breaking point, the tape will have low resiliency; if the tape is not stretched up to its breaking point, it will retain sufficient residual resiliency to apply tension to the load of unitized objects, i.e., in the manner of a large rubber band. Unlike a rubber band, however, the tape preferably exhibits a low degree of recovery. Tape having a relatively higher degree of recovery can be used if it is applied by power-driven machinery and if it does not retackify upon recovery.

The layer of pressure-sensitive adhesive of the tape has sufficient shear strength and adhesive holding power to adhere to the small regions of the objects to which the tape is attached. The holding power of the adhesive to any substrate is preferably both less than the cohesive strength of the adhesive and less than the adhesion of the adhesive to the backing, so that the adhesive layer or a portion thereof will not separate from the backing when the backing is subjected to stretching. The adhesive layer is also preferably highly extensible. The adhered portion of the tape can be cleanly released from a surface to which it is adhered by stretching it at an angle of less than 35° from the surface to which it is adhered.

The characteristic of detackification of the tape by means of stretching prevents the tape from adhering to the surface of objects. This is important, as permanent adhesion would deface the surface of the object upon removal of the tape therefrom. The amount of tape that must adhere to an object to provide sufficient anchorage for a strapping application can constitute a relatively insignificant portion of the total amount of tape required for the application. The characteristic of stretchability can allow a relatively small quantity of tape to be used for a given unitizing application.

The characteristic of detackification upon being stretched allows the tape disclosed herein to be used for unitizing packages, particularly packages contained on a pallet, for closing and securing single packages, and for securing bundles of loose articles, such as for example, rods and sheets made of wood, metal, or fibrous materials. In effect, the tape can be used as a replacement for string, twine, or wire.

DETAILED DESCRIPTION

Figure 1:
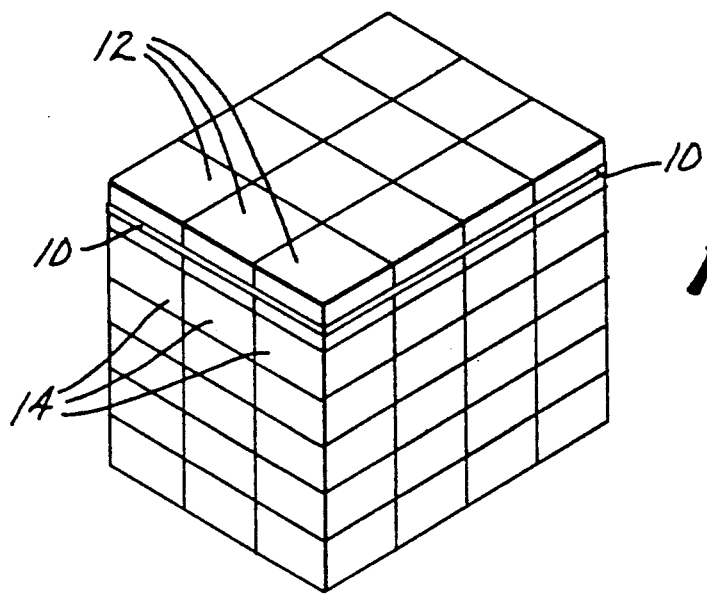
FIG. 1 is a perspective view of a plurality of packages arranged in tiers and having a single strip of stretchable, detackifiable, pressure-sensitive adhesive tape wrapped around one tier of packages.

A tape suitable for this invention is fully described in Assignee's copending U.S. application Ser. No. 07/632,173, filed Dec. 20, 1990, incorporated herein by reference. However, tapes other than that particular tape are suitable for the method of this invention. In general, tape 10 comprises a backing bearing on at least one major surface thereof a layer of pressure-sensitive adhesive. The major surface of the backing not bearing the layer of pressure-sensitive adhesive can optionally bear a layer of low-adhesion backsize composition.

Materials suitable for the backing of the tape useful in this invention include highly extensible polymeric sheet materials having (1) a high tensile strength; (2) a lengthwise elongation at break of from about 50 to about 1,500%, preferably from about 150 to about 800%, more preferably from about 200 to about 800% still more preferably from about 600 to about 800%; (3) substantial inelasticity, e.g., preferably having less than about 50% elastic recovery after being stretched, more preferably less than about 30% elastic recovery, still more preferably less than about 20% elastic recovery; and (4) a Young's modulus of at least about 2,500 psi, preferably at least about 3,000 psi, but less than about 100,000 psi, more preferably between about 5,000 and about 30,000 psi. A suitable method for measuring the Young's modulus of a material is described in ASTM Designation D882-88, Standard Test Methods for Tensile Properties of Thin Plastic Sheeting. If the Young's modulus is too low, the tape loses its plastic character and becomes rubbery.

Representative examples of materials suitable for the backing of the tape of this invention include polyolefins, such as polyethylene, including high density polyethylene, low density polyethylene, linear low density polyethylene, and linear ultra low density polyethylene, polypropylene, and polybutylenes; vinyl copolymers, such as polyvinyl chlorides, both plasticized and unplasticized, and polyvinyl acetates; olefinic copolymers, such as ethylene/methacrylate copolymers, ethylene/-vinyl acetate copolymers, acrylonitrile/butadiene/styrene copolymers, and ethylene/propylene copolymers; acrylic polymers and copolymers; and combinations of the foregoing. Mixtures or blends of any plastic or plastic and elastomeric materials such as polypropylene/-polyethylene, polyurethane/polyolefin, polyurethane/-polycarbonate, polyurethane/polyester, can also be used. Backings are typically in the form of single or multi-layer films. Backings are preferably selected from polyethylene and polypropylene films, with the most preferred materials being linear low density and ultra low density polyethylene films.

Backings can be made by any known method of film forming, such as, for example, extrusion, co-extrusion, solvent casting, foaming, non-woven technology, and the like. The backing can have any thickness so long as it possesses sufficient integrity to be processable and handleable, with thicknesses preferably ranging from about 10 micrometers to 750 micrometers. Backings having thicknesses lower than about 10 micrometers are not preferred for aggressive adhesives. Backings having thicknesses higher than about 750 micrometers tend to require stretching forces that are higher than desired, thereby making applications more difficult, except by power driven machinery.

The adhesive of the adhesive layer can comprise any pressure-sensitive adhesive, with the particular adhesion properties being dependent on the use of the tape, with the preferred adhesion properties generally ranging from about 4 N/dm to about 200 N/dm, preferably from about 25 N/dm to about 100 N/dm, at a peel angle of 180°, measured according to PSTC-1 and PSTC-3 and ASTM Designation D903-83 at a peel rate of 12.7 cm/min.

Pressure-sensitive adhesives suitable for this invention include tackified rubber adhesives, such as natural rubber, olefins, silicones, polyisoprene, polybutadiene, polyurethanes, styrene-isoprene-styrene and styrene-butadiene-styrene block copolymers, and other elastomers; and tackified or untackified acrylic adhesives such as copolymers of isooctylacrylate and acrylic acid, which can be polymerized by radiation, solution, suspension, or emulsion techniques. The most preferred adhesives are tackified block copolymers. For some purposes, adhesives that are incapable of providing enhanced adhesion over time are desired, so that removal of the tape by peeling at a less than optimum angle will not excessively deface the package.

The thickness of the adhesive layer can range from about 15 micrometers to about 1,000 micrometers, preferably from about 25 micrometers to about 400 micrometers. In this preferred range of thicknesses, the thicker layers will detackify less than will thinner layers. Alternatively, the coating weight of the adhesive in the adhesive layer can range from about ½ grain/24 sq. in. to about 50 grains/24 sq. in., preferably from 3 grains/24 sq. in. to 15 grains/24 sq. in.

As the tape is stretched, the adhesive must detackify. As used herein, the term "detackification" means reduction of tack and adhesion, as measured by the Pressure-Sensitive Tack Test, which will be described in detail below. As a practical matter, upon stretching, tack is preferably reduced by at least 10%, more preferably by at least 25%, and even more preferably by at least 50%. It is believed that the adhesive detackifies because the coating weight of the adhesive layer decreases on account of the increased area of the surface of the backing. Surprisingly, the level of detackification exceeds what would have been expected merely from a decrease in coating weight per unit area.

The tape of this invention can be produced by any conventional method for preparing pressure-sensitive adhesive tapes. For example, the adhesive can either be directly coated onto the backing, or it can be formed as a separate layer and then later laminated to the backing. In some cases, in order to improve adhesion of the adhesive layer to the backing, the backing can be pretreated prior to the coating step or the laminating step in one or more of the following ways: corona discharge, plasma discharge, flame treatment, electron beam irradiation, ultraviolet radiation, acid etching, or chemical priming. Such pretreatments can be carried out with or without reactive chemical adhesion promoters such as hydroxyethyl acrylate or hydroxyethyl methacrylate, or other reactive species of low molecular weight. Corona discharge pretreatment is generally preferred if a polymeric film backing is used.

If it is desired to dispense the tape from a roll, it is preferred that the major surface of the backing not bearing a pressure-sensitive adhesive bear a layer of a low-adhesion backsize composition thereon to allow ease in unwinding. Alternatively, the layer of pressure-sensitive adhesive can be covered with a release liner. Low-adhesion backsize composition suitable for the tape useful in this invention can be selected from those known in the art, such as, for example, those described in U.S. Pat. Nos. 2,532,011; 4,279,717; 4,961,963; 4,968,766; and 4,342,815, all of which are incorporated herein by reference.

In one of the simplest embodiments, as shown in FIG. 1, a tape 10 can be wrapped around a tier of objects, e.g., packages 12, that are resting on one or more tiers of objects, e.g., packages 14. This simple embodiment would be expected to be most useful for light handling, e.g., moving a pallet a short distance at a low rate of speed, as in a warehouse.

Figure 2:
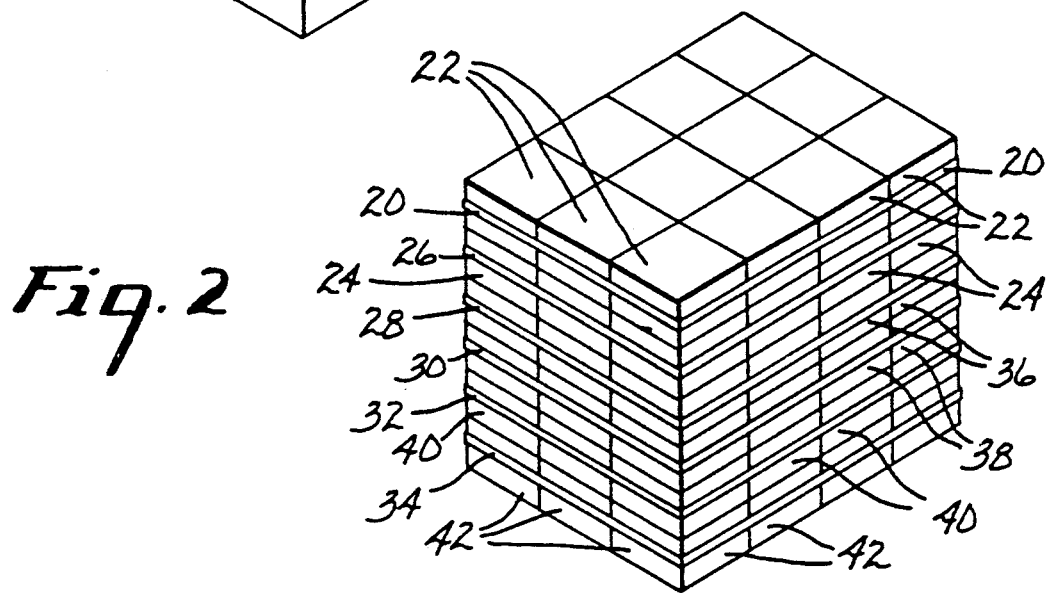
FIG. 2 is a perspective view of a plurality of packages arranged in tiers and having a single strip of stretchable, detackifiable, pressure-sensitive adhesive tape wrapped around each tier of packages.

In an extension of this embodiment, as shown in FIG. 2, a tape 20 can be wrapped around a tier of objects, e.g., packages 22, that are resting on one or more tiers of objects, e.g., packages 24, and the second tier of objects, e.g., packages 24, can be wrapped by a second strip of tape 26. Additional strips of tape 28, 30, 32, 34 can be used to wrap additional tiers of objects, e.g., packages 36, 38, 40, 42.

Figure 3A:
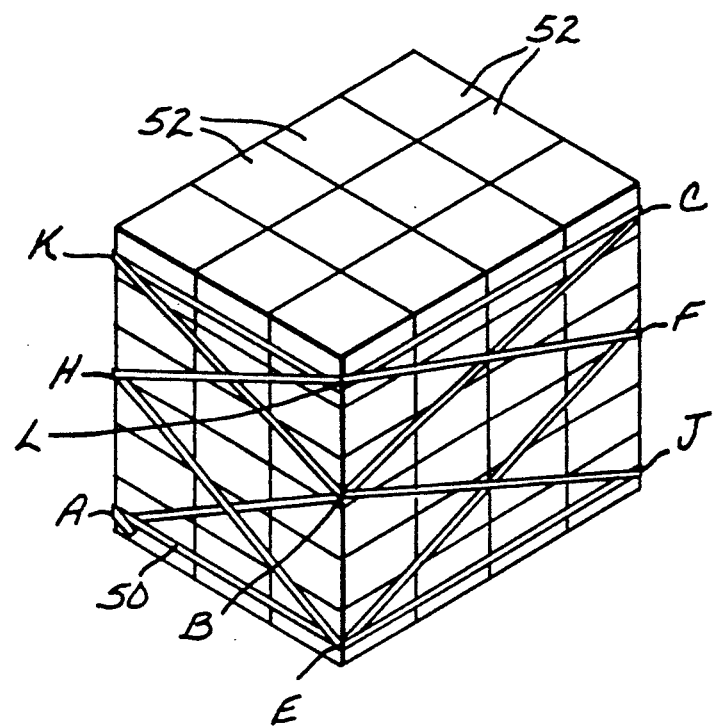
FIG. 3a is a perspective view of the front of a plurality of packages arranged in tiers and having a single strip of stretchable, detackifiable, pressure-sensitive adhesive tape wrapped around several tiers of packages in a manner such that shifting of the packages is minimized.
Figure 3B:
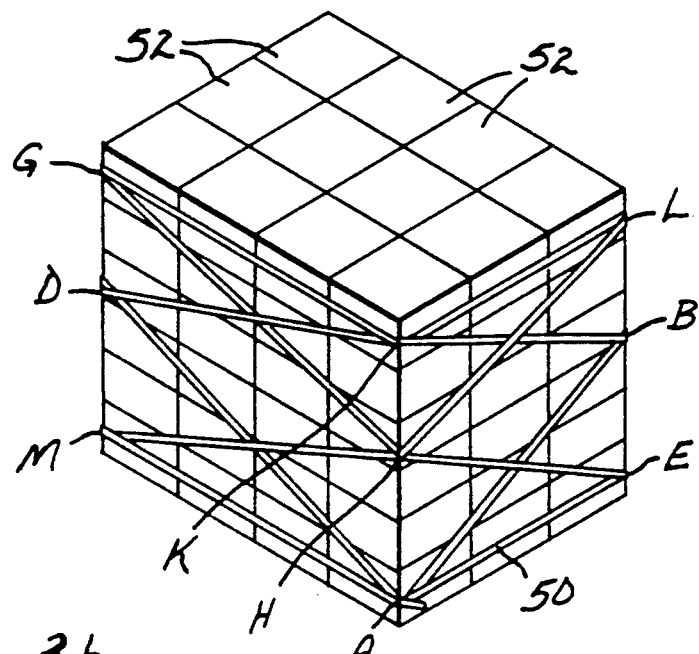
FIG. 3b is a perspective view of the plurality of packages shown in FIG. 3a, but with the arrangement rotated 90°.

In a more complex embodiment, as shown in FIG. 3a and FIG. 3b, a tape 50 can be wrapped in a crossing pattern around a group of objects, e.g., packages 52, arranged in a plurality of tiers. This pattern provides equal and counteracting forces that stabilize the objects, thereby preventing them from shifting when exposed to vibrational forces. This pattern would be expected to be effective for severe handling, e.g., over-the-road trucking, long distances at a high rate of speed.

With respect to the arrangement of objects shown in FIGS. 3a and 3b, the material handler can attach a portion of the tape 50 to a package 52 at point A. The portion of the tape should be wrapped around a corner of the package 52 so that subsequent stretching of the tape 50 will not cause the tape to release from the surface of the package 52. Tape 50 is then stretched and guided so as to contact, in sequence, a second package 52 at point B, a third package 52 at point C, a fourth package 52 at point D, the first package 52 at point A, a fifth package 52 at point E, a sixth package 52 at point F, a seventh package 52 at point G, an eighth package 52 at point H, the fifth package 52 at point E, a ninth package 52 at point J, the fourth package 52 at point D, a tenth package 52 at point K, an eleventh package 52 at point L, the third package 52 at point C, the eighth package 52 at point G, the tenth package 52 at point K, the second package 52 at point B, the ninth package 52 at point J, a twelfth package 52 at point M, the eighth package 52 at point H, the eleventh package 52 at point L, the sixth package 52 at point F, the twelfth package 52 at point M, and the first package 52 at point A.

The tape is preferably applied to the packages on a pallet under tension, the tape thereby retaining some of its elastomeric properties. In effect, the tape acts as though it were a large rubber band. However, the tape preferably exhibits much less recovery than a rubber band.

It is within the scope of this invention to include the pallet itself as an object, i.e., the tape can be wrapped around both the objects to be stored and the pallet bearing them.

The detackification characteristic of the tape allows the tape to be removed from the objects without damaging the surfaces of the objects. It has also been found that stretching the tape also increases the tensile strength of the tape.

Figure 4A:
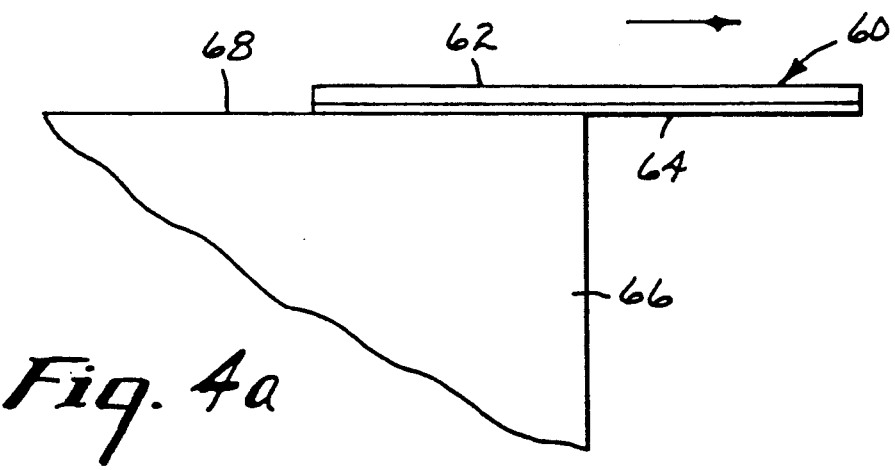
FIG. 4a, 4b, and 4c are schematic views illustrating how the detackifiable tape operates in the method of this invention.
Figure 4B:
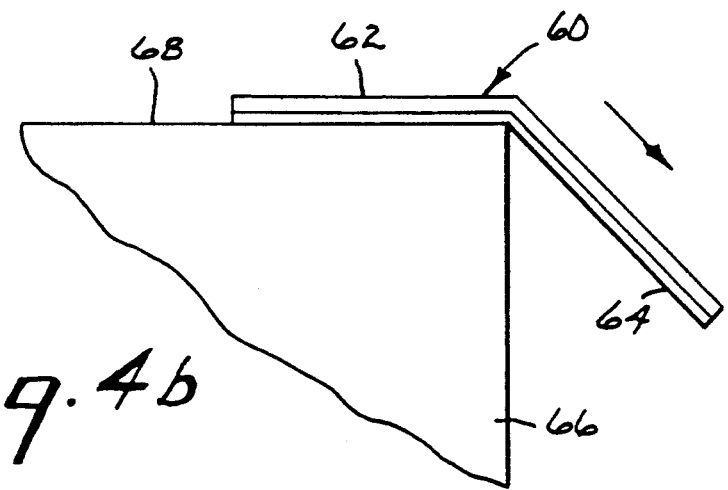
Figure 4C:
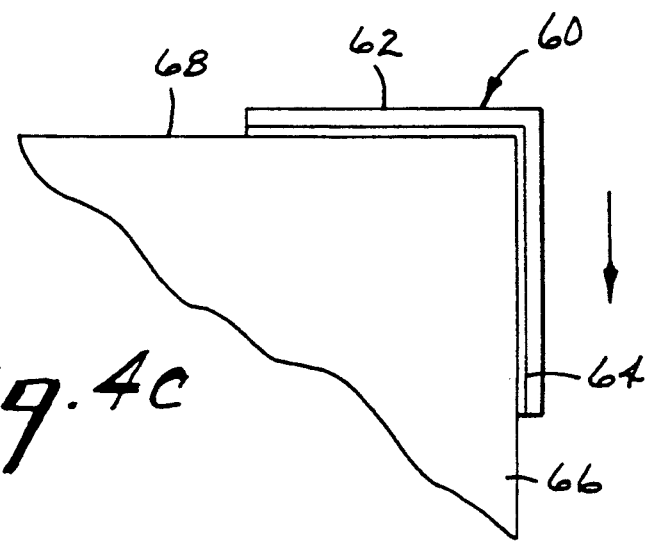

Referring to FIGS. 4a, 4b, and 4c, it can be seen how a tape 60 having a backing 62 and a layer of pressure-sensitive adhesive 64 can be pulled and stretched without detaching from an object 66 prematurely. If the tape 60 is pulled at an angle of less than 35° from the horizontal, as shown in FIG. 4a, the portion of the tape 60 adhered to surface 68 of the object 66 will release and the portion of the tape 60 will no longer adhere to surface 68. If the tape 60 is pulled at an angle of from about 35° to about 45° from the horizontal, as shown in FIG. 4b, the portion of the tape 60 adhered to surface 68 will not significantly detackify and the portion of the tape 60 will remain adhered to surface 68. If the tape 60 is pulled at an angle of greater than 45° from the horizontal, as shown in FIG. 4c, the portion of the tape 60 adhered to surface 68 will not detackify and the portion of the tape 60 will remain adhered to surface 68. Alternatively, the users of the tape can exercise sufficient care so as to stretch the tape without removing from the surface of the object the portion of the tape adhered thereto.

The volume of tape required to unitize a group of objects is considerably less than the amount of shrink wrap or stretch wrap required to unitize those objects. Accordingly, less solid waste requiring disposal is generated.

The method of this invention can be used to unitize a plurality of containers or other objects even if they are not disposed or arranged in a plurality of tiers on a pallet or other type of platform.

Figure 5:
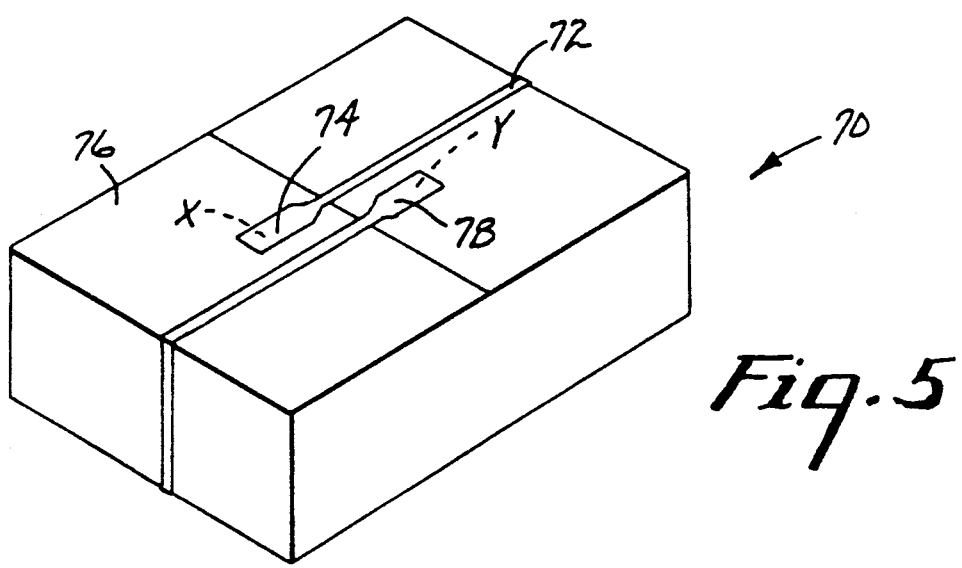
FIG. 5 is a perspective view of a box closed and secured by a tape stretched according to the method of this invention.

The method of this invention can also be used to wrap and secure a single object, e.g., a box 70, with the tape 72 described herein. Referring to FIG. 5, a small piece 74 of the tape 72, as from a roll, is adhered to surface 76 of the box 70 at point X. The tape 72 is then slowly unwound from the roll (not shown) and simultaneously stretched to detackify the portion of the tape 72 not adhering to the box 70 at point X. At the same time that the tape 72 is unwound, it is wrapped around the box 70 so as to close it. After the box 70 is wrapped as desired, a small portion 78 of the tape 72 is unwound, but not stretched. This portion is attached to the box 70 at point Y to secure the tape 72 around the closed box 70. Significant adhesion between the tape 72 and the box 70 is obtained only at points X and Y. When the tape 72 is removed from the box 70, the area of potential damage to the box is limited to points X and Y. Wrapping configurations other than that shown in FIG. 5 can be used to close and secure individual boxes.

Other methods involving the tape described herein include masking, sealing, and insulating.

In a number of applications, e.g., in the automotive area, masking is critical, as it is necessary to conform to irregularities of the surface to be masked. In this case, the stretching capability can be used to achieve the necessary conformity. Typically, stretching is carried out at a fairly low rate, e.g., 10 to 20%, at those places where conformity is needed.

In the area of plumbing, tapes can be used to wind around a thread of a first tube that is to be connected to a second tube. Instead of employing a polytetrafluoroethylene connector, the stretchable tape can be used to generate a very thin layer for the sealing of the thread.

For low voltage electrical applications, the stretchable tape can also be used for insulation purposes.

Another useful application for the tape of this invention is the wrapping of a plurality of cables by stretching and wrapping the tape of this invention about the cables in a spiral configuration.

Adhesion of the tape to an object in the stretched area of the tape can be controlled by specifying the degree of stretching or by specifying the appropriate adhesive.

While not exhibiting as many useful functions as the tape previously described, tapes having backings bearing layers of adhesive on both major surfaces thereof can also be used in the method of this invention.

The following non-limiting examples further illustrate the means of the present invention.

TEST METHODS

Pressure-Sensitive Tack Test

A one inch by one inch strip of the tape is adhered to an annular ring having a weight of 78.5 g. A stainless steel test probe (SS) or a polyethylene test probe (PE)(both of which are ⅜ inch in diameter) is raised through the center of the annular ring at a speed of 1 cm/sec and brought into contact with the adhesive-bearing surface. After a dwell time of one second, the probe is separated from the adhesive-bearing surface and the maximum force needed to separate the probe from the adhesive-bearing surface is measured and recorded. Additional details of this test are set forth in ASTM Designation D2979-82.

180° Peel Adhesion to Stainless Steel

A sample of tape having dimensions one inch wide by 10 to 12 inches long is adhered to a stainless steel (AISI 302 or 304) test panel having dimensions of at least two inches wide by five inches long by 1/16 inch thick along the centerline of the test panel so that from five to seven inches of the sample of tape extend beyond the edge of the test panel. The sample of tape is rolled once in each direction with a five pound roller. An end of the sample of the tape not in contact with the test panel is doubled back and an approximately one inch portion of it is peeled from the test panel. The end of the panel is clamped in the lower jaw of the tensile tester. The end of the sample of tape is doubled over to form a tab. This tab is clamped into the upper jaw of the tensile tester. The jaws are separated at a rate of 12 in/min, the average adhesion value being noted. Additional details of this test are set forth in "Test Methods for Pressure-Sensitive Tapes", Pressure-Sensitive Tape Council, Glenview, Illinois, 9th Edition, as PSTC-3.

180° Peel Adhesion to Fiberboard

This test is carried out the same way as the 180° Peel Test, with exception that the test surface is Mosinee 696-C paper (available from Mosinee Paper Corp., Mosinee, Wisconsin) attached to the entire surface of one side of the stainless steel test panel by means of a double coated tape.

180° Peel Adhesion to Corrugated Sheet

This test is carried out the same way as the 180° Peel Test with exception that the test surface is a two inches wide by five inches long by 0.165 inch thick, 200 # Kraft Faced Corrugated Box material, with the flutes running in the lengthwise direction.

Mechanical Handling of Unitized Load

Boxes made of corrugated sheet and having the dimensions 10½ inches by 12½ inches by 15¼ inches and containing 12 to 15 pounds of sand for dunnage were stacked in a three by three by seven box configuration on a standard 42 inch by 48 inch pallet. The projections from a lift truck equipped with forks can engage the pallet from any direction, i.e., front, back, left side, right side. Using a lift truck equipped with forks, the operator engages, lifts, and transports the pallet through an L-shaped test course at a walking speed not to exceed five ft/sec. The L-shaped test course includes a 10 to 11½ feet wide aisle with a 90° turn and an acceleration/deceleration zone. The pallets allow access from any direction and are tested in directions that are perpendicular to each other, e.g., front and right side. Additional details on this test are set forth in ASTM Designation D1083-88.

Vibration Test

A unitized pallet as described in the Mechanical Handling of Unitized Load Test was loaded onto a Vibration Test Machine. The Vibration Test Machine consisted of a flat horizontal test surface that distributed an applied vibration uniformly throughout a platform. The platform was driven to move only vertically in a sinusoidal motion. The frequency and amplitude of the motion were variable, controllable, and covered a range of acceptable breadth. The test cycle consisted of a sweep of frequency starting at three Hz. and sweeping to 100 Hz. and then back to three Hz. Separate sweeps were run at acceleration levels from 0.1 g to 0.5 g. Additional details of this test are set forth in ASTM Designation D3580-89.

EXAMPLE I

A series of tapes employing a block copolymer based pressure-sensitive adhesive composition were prepared to illustrate adhesion to various surfaces, and fiber pull from the surfaces of various packaging materials. Each tape of the series was prepared by coating one major surface of a 5 mil linear low density polyethylene (LLDPE) backing with a tackified pressure-sensitive adhesive. The adhesive was a styrene-isoprene-styrene-based block copolymer ("Kraton" 1107) tackified with hydrocarbon resin ("Wingtack Extra").

The formulation for the adhesive of this example was similar to that described in U.S. Pat. No. 3,239,478, incorporated herein by reference, and is as follows:

| Ingredient | Amount (phr) |
| --- | --- |
| Styrene-isoprene-styrene block copolymer ("Kraton" 1107, Shell Chemical Co.) | 100 |
| Hydrocarbon resin tackifier ("Wingtack Extra", The Goodyear Tire and Rubber Co.) | 100 |
| Antioxidant ("Irganox" 1076, Ciba-Geigy Corp.) | 1.5 |
| Antioxidant ("Cyanox LTDP", American Cyanamid Co.) | 1.5 |

The low adhesion backsize composition comprised a copolymer of vinyl N-octadecyl carbamate and vinyl acetate, which was described in U.S. Pat. No. 2,532,011, incorporated herein by reference.

The backing had been corona treated on both major surfaces thereof. A low-adhesion backsize composition was applied to the major surface of the backing not bearing the adhesive. The coating weight of adhesive of each of the unstretched and stretched tapes of the series, in grains per 24 sq. in., are set forth in Table 1. The tape exhibited 720% elongation when stretched by hand.

TABLE 1

| Sample no. | Coating weight (unstretched) | Coating weight (stretched) |
| --- | --- | --- |
| 1 | 2.1 | 1.4 |
| 2 | 3.7 | 1.5 |
| 3 | 4.9 | 2.0 |
| 4 | 5.7 | 2.2 |
| 5 | 8.4 | 3.6 |
| 6 | 9.2 | 4.3 |

The data in Table 1 indicate that stretching to ultimate yield can give a 2.3 times reduction (approximately) in adhesive coating weight per unit area. The reduction is believed to result from an increase in the surface area of the backing. This reduction results in a reduction in tack and adhesion.

Adhesion, in oz. per in., to corrugated paperboard is set forth in Table 2.

TABLE 2

| Sample no. | Adhesion (oz./in.) | | Fiber pull (%) | |
| --- | --- | --- | --- | --- |
| | (unstretched) | (stretched) | (unstretched) | (stretched) |
| 1 | 16.3 | 1.0 | 100 | 0 |
| 2 | 17.7 | 3.7 | 100 | 0 |
| 3 | 21.3 | 6.0 | 100 | 0 |
| 4 | 19.7 | 7.0 | 100 | 0 |
| 5 | 18.7 | 10.7 | 100 | 0 |
| 6 | 19.0 | 11.3 | 100 | 0 |

Pressure-sensitive tack, in g/0.1 sq. in., is set forth in Table 3.

TABLE 3

| Sample no. | Tack - SS probe (g/0.1 sq. in.) | | Tack - PE probe (g/0.1 sq. in.) | |
| --- | --- | --- | --- | --- |
| | (unstretched) | (stretched) | (unstretched) | (stretched) |
| 1 | 1319 | 276 | 909 | 125 |
| 2 | 1381 | 494 | 977 | 301 |
| 3 | 1832 | 793 | 1273 | 254 |
| 4 | 2048 | 813 | 1424 | 370 |
| 5 | 2232 | 1210 | 1645 | 319 |
| 6 | 2156 | 969 | 1501 | 269 |

In Table 4, both adhesion to the surface of fiberboard and fiber pull from the surface of fiberboard are set forth for the tape.

TABLE 4

| Sample no. | Adhesion (oz./in.) | | Fiber pull (%) | |
| --- | --- | --- | --- | --- |
| | (unstretched) | (stretched) | (unstretched) | (stretched) |
| 1 | 14 | 10 | 97 | 35 |
| 2 | 14 | 14 | 93 | 73 |
| 3 | 15 | 15 | 93 | 97 |
| 4 | 15 | 13 | 97 | 36 |
| 5 | 19 | 15 | 95 | 60 |
| 6 | 15 | 16 | 95 | 87 |

EXAMPLE II

A series of tapes employing an acrylate-based pressure-sensitive adhesive composition was prepared to illustrate adhesion to various surfaces, and fiber pull from the surfaces of various packaging materials. Each tape of the series was prepared by coating one major surface of a 4 mil LLDPE backing with a tackified pressure-sensitive adhesive. The adhesive was an acrylate adhesive comprising 90 parts by weight isooctyl acrylate and 10 parts by weight acrylic acid prepared according to Re. 24,906 (Ulrich), incorporated herein by reference. The backing had been corona treated on both major surfaces thereof. A low-adhesion backsize composition was applied to the major surface of the backing not bearing the adhesive. The low-adhesion backsize composition was of the type described in Example 1. The coating weight of adhesive of each of the unstretched and stretched tapes of the series, in grains per 24 sq. in., are set forth in Table 5.

TABLE 5

| Sample no. | Coating weight (unstretched) | Coating weight (stretched) |
|---|---|---|
| 1 | 3.7 | 1.3 |
| 2 | 6.0 | 1.6 |
| 3 | 10.5 | 3.0 |
| 4 | 12.8 | 2.7 |

The data in Table 5 indicate that stretching to ultimate yield can give a 3.7 times reduction (approximately) in adhesive coating weight per unit area. The reduction is believed to result from an increase in the surface area of the backing.

Both adhesion to the surface of corrugated paperboard and fiber pull from the surface of corrugated paperboard are set forth in Table 6.

TABLE 6

| Sample no. | Adhesion (oz./in.) (unstretched) | Adhesion (oz./in.) (stretched) | Fiber pull (%) (unstretched) | Fiber pull (%) (stretched) |
|---|---|---|---|---|
| 1 | 15.3 | 6.7 | 98 | 12 |
| 2 | 15.5 | 8.5 | 97 | 20 |
| 3 | 14.0 | 13.2 | 100 | 44 |
| 4 | 15.2 | 15.0 | 199 | 94 |

Both adhesion to the surface of fiberboard and fiber pull from the surface of fiberboard are set forth in Table 7.

TABLE 7

| Sample no. | Adhesion (oz./in.) (unstretched) | Adhesion (oz./in.) (stretched) | Fiber pull (%) (unstretched) | Fiber pull (%) (stretched) |
|---|---|---|---|---|
| 1 | 14.7 | 9.3 | 75 | 5 |
| 2 | 14.2 | 13.7 | 100 | 100 |
| 3 | 13.5 | 15.0 | 100 | 100 |
| 4 | 14.7 | 15.7 | 199 | 77 |

The data in the foregoing tables show that there is a greater decrease in adhesion than would have been expected from a mere reduction in adhesive coating weight. For example, the adhesion and tack of a tape having a stretched coating weight of 2.0 to 2.2 grains per 24 sq. in. (i.e., Sample nos. 3 and 4) is significantly lower than the adhesion and tack of a tape having an unstretched coating weight of 2.1 grains per 24 sq. in. (i.e., Sample no. 1). A decrease in adhesion correlates directly with a reduction in tack, i.e., detackification.

EXAMPLE III

A group of containers was unitized by means of the stretchable tape disclosed herein in the manner shown in FIG. 3. The tape was applied by hand at a stretch ratio of 6 to 1. For the purpose of comparison, a second group of containers, identical to the first group, was unitized by means of stretch wrap, also applied by hand. Both groups of unitized containers were subjected to the mechanical handling test and the vibration (table) test. The load displacement for each type of wrapping was similar, and each type of wrapping was deemed to be adequate for use in a manufacturing facility.

The tape and stretch wrap were then removed from the unitized containers, and the scrap tape and scrap wrap were weighed. The stretch wrap weighed 7.4 ounces. The stretch tape weighed 2.3 ounces. Thus, the use of tape resulted in a 70% reduction in waste.

Various modifications and alterations of this invention will become apparent to those skilled in the art without departing from the scope and spirit of this invention, and it should be understood that this invention is not to be unduly limited to the illustrative embodiments set forth herein.

What is claimed is:

1. A method of unitizing at least two objects that are arranged in one or more tiers, at least one of said tiers comprising at least one object, said method comprising the steps of:
   (1) providing a stretchable, detackifiable pressure-sensitive adhesive tape having (1) a backing having a Young's modulus of at least about 2,500 psi but less than about 100,000 psi, a lengthwise elongation at break of at least about 150% and low recovery, (2) said backing bearing a layer of pressure-sensitive adhesive thereon;
   (2) adhering a first small portion of said tape to a small portion of one of said objects;
   (3) stretching said tape sufficiently to detackify the portion thereof not adhered to said one of said objects;
   (4) wrapping said detackified portions of said tape around at least two of said objects; and
   (5) adhering a second portion of said tape to a small portion of one of said objects, whereby said objects are capable of resisting mechanical handling and vibration of said arranged objects.

2. The method of claim 1, wherein said objects are arranged in at least two tiers.

3. The method of claim 2, wherein said tape is wrapped around all of said objects on at least one of said tiers.

4. The method of claim 1, wherein said objects comprise packages having at least six sides.

5. The method of claim 1, wherein said tape is wrapped in a direction substantially parallel to the plane formed by the uppermost surfaces of said objects.

6. The method of claim 1, wherein said tape is wrapped in a direction substantially non-parallel to the plane formed by the uppermost surfaces of said objects.

7. The method of claim 1, wherein said tape is wrapped in both a direction substantially parallel to the plane formed by the uppermost surfaces of said objects and a direction substantially non-parallel to the plane formed by the uppermost surfaces of said objects.

8. The method of claim 1, wherein at least one stretched and wrapped portion of said tape crosses over at least another stretched and wrapped portion of said tape.

9. A method of closing and securing a package comprising the steps of:
   (1) providing a stretchable, detackifiable pressure-sensitive adhesive tape having (i) a backing having a Young's modulus of at least about 2,500 psi but less than about 100,000 psi, a lengthwise elongation at break of at least about 150% and low recovery, (2) said backing bearing a layer of pressure-sensitive adhesive thereon;
   (2) adhering a first small portion of said tape to a small portion of said package;
   (3) stretching said tape sufficiently to detackify the portion thereof not adhered to said package;

(4) wrapping said detackified portion at least partially around said package; and (5) adhering a second small portion of said tape to a small portion of said package, whereby said package is capable of remaining closed and secured.

10. The method of claim 8, wherein said package has at least six sides.

11. A method of unitizing a plurality of objects comprising the steps of:

(1) providing a stretchable, detackifiable pressure-sensitive adhesive tape having (1) a backing having a Young's modulus of at least about 2,500 psi but less than about 100,000 psi, a lengthwise elongation at break of at least about 150% and low recovery, (2) said backing having a layer of pressure-sensitive adhesive thereon;

(2) adhering a first small portion of said tape to a small portion of at least one of said objects;

(3) stretching said tape sufficiently to detackify the portion thereof not adhered to said object;

(4) wrapping said detackified portion of said tape around said plurality of said objects; and (5) adhering a second portion of said tape to a small portion of at least one of said objects, whereby said plurality of said objects is unitized in the form of a bundle.

* * * * *

UNITED STATES PATENT AND TRADEMARK OFFICE
CERTIFICATE OF CORRECTION

PATENT NO. : 5,314,557
DATED : May 24, 1994
INVENTOR(S) : Schwartz et al.

It is certified that error appears in the above-indentified patent and that said Letters Patent is hereby corrected as shown below:

Col. 11, Table 7, line 41, under Fiber pull(%) (unstretched), Sample no. 4 should be --100--.

Signed and Sealed this

Fourth Day of April, 1995

BRUCE LEHMAN

Attest:

Attesting Officer

Commissioner of Patents and Trademarks